United States Patent [19]
Radvan et al.

[11] Patent Number: 4,670,331
[45] Date of Patent: Jun. 2, 1987

[54] MOULDED FIBER REINFORCED PLASTICS ARTICLES

[75] Inventors: Bronislaw Radvan, Flackwell Heath; William T. H. Skelding, High Wycombe, both of England

[73] Assignee: The Wiggins Teape Group Limited, Basingstoke, England

[21] Appl. No.: 688,811

[22] Filed: Jan. 4, 1985

[30] Foreign Application Priority Data

Jan. 6, 1984 [GB] United Kingdom ............... 8400293

[51] Int. Cl.$^4$ ........................... B32B 5/02; B32B 5/28
[52] U.S. Cl. .................................... 428/303; 156/245; 264/41; 264/112; 264/230; 264/257; 264/320; 264/324
[58] Field of Search ............... 264/41, 112, 113, 120, 264/125, 320, 324, 230, 257; 156/245

[56] References Cited

U.S. PATENT DOCUMENTS

| | | | |
|---|---|---|---|
| 2,715,755 | 8/1955 | Jones | 264/121 |
| 3,621,092 | 11/1971 | Hofer | 264/322 |
| 3,891,738 | 6/1975 | Shen | 264/120 |
| 4,178,411 | 12/1979 | Cole et al. | 264/41 |
| 4,273,981 | 6/1981 | Nopper | 264/120 |
| 4,399,085 | 8/1983 | Belbin et al. | 264/41 |
| 4,426,470 | 1/1984 | Wessling et al. | 524/35 |

FOREIGN PATENT DOCUMENTS

| | | |
|---|---|---|
| 1129757 | 10/1968 | United Kingdom . |
| 1305982 | 2/1973 | United Kingdom . |
| 1306145 | 2/1973 | United Kingdom . |
| 1329409 | 9/1973 | United Kingdom . |
| 1348896 | 3/1974 | United Kingdom . |

OTHER PUBLICATIONS

McKelvey, James M. *Polymer Processing* New York, John Wiley and Sons, ©1962, pp. 1–5.
Fiber Foam: A Rheological Phenomenon; Turner, et al.; VIIth International Congress on Rheology; Aug. 1976.

*Primary Examiner*—Philip Anderson
*Attorney, Agent, or Firm*—Burns, Doane, Swecker & Mathis

[57] ABSTRACT

A process for moulding articles of fiber reinforced plastics material which includes heating and moulding a sheet of consolidated thermoplastics material which has dispersed therein from 20% to 70% by weight of reinforcing fibers which have a high modulus of elasticity (as herein defined) and between about 7 and about 50 millimeters long so that the stresses embodied in the glass fibers cause the matrix to expand into the configuration of the mould and become porous.

15 Claims, 3 Drawing Figures

MOULDED FIBRE REINFORCED PLASTICS ARTICLES

This invention relates to moulded articles of fiber reinforced plastics material and to a method of moulding such articles.

Heretofore, fiber reinforced plastics articles have been moulded from consolidated sheets of thermoplastics material reinforced with glass fiber mat formed from very long glass fiber strands (i.e. fiber bundles) of perhaps 200 centimeters or more in length which extend in a random serpentine manner throughout the sheet.

Thus, for example, in the manufacture of one such material, layers of glass fiber mat are interposed between layers of thermoplastics material, the composite structure being needled to produce a degree of integration of the layers, and then heated under pressure to produce the consolidated rigid sheet.

When such materials are heated to the softening temperature of the plastics matrix, prior to being fed into a forming press, slight expansion in thickness will occur. This is probably because the layers of mineral fibre, which are usually of glass, which had been pressed together during the laminating stage, spring back to partly regain their original configuration. However this expansion is relatively limited in extent and also results in the surface of the material being marred by coarse fibres and fiber bundles protruding out of the molten plastics matrix. Both of these drawbacks are particularly severe in the case of a needled construction.

The bundles of fibres which had been forced by the needling operation into loops normal to the surface of the sheet emerge and rise high above the surface to give an uneven hairy appearance. But the central layers of the web hardly expand in thickness, with the result that the stiffness of the expanded sheet hardly exceeds that of the original consolidated sheet.

Because of these problems, the hot expanded sheet is invariably formed into the required shape and cooled to below the softening temperature whilst under pressure in the mould so as to ensure that the moulded article is fully consolidated. In that condition, the moulded article will possess the maximum strength but its flexural stiffness is relatively low compared with its weight and the moulding will of course be impermeable.

According to the present invention a process for moulding articles of fibre reinforced plastics material includes heating and moulding a sheet of consolidated thermoplastics material which has dispersed therein from 20% to 70% by weight of reinforcing fibres which have a high modulus of elasticity (as herein defined) and between about 7 and about 50 millimeters long so that the stresses embodied in the glass fibres cause the matrix to expand into the configuration of the mould and become porous.

It has been found that the extent of the expansion and the relative increase in thickness of the finished moulding compared with the original sheet is much larger and more uniform than in the case of materials of known construction, resulting in an article which has a very much higher flexural stiffness and a relatively smooth coherent surface. This is especially the case when the degree of expansion is controlled by setting the dimensions of the forming tool to clearances less than the final thickness which would be achieved by free unrestricted expansion.

The relative improvement, and the method of achieving it, will become clear from the following comparative example.

COMPARATIVE EXAMPLE

Samples of consolidated glass fiber reinforced thermoplastic sheet materials were cut to a width of approximately 2 centimeters each and placed together side by side on the lower platen of a hot press. The upper platen was then closed to a height of 6 millimeters, which was considerably greater than the thckness of any of the samples. The press was then heated to a temperature of 200° C., that is in excess of the softening point of the samples. After 5 minutes, the press was cooled and opened and the degree of expansion of each sample noted. The results are set out in Table 1.

TABLE 1

| Example | Material | Thickness (millimeters) Before expansion | Thickness (millimeters) After expansion | Surface character after expansion |
|---|---|---|---|---|
| 1 | 60% by weight polypropylene reinforced with needled glass fibre mat | 3.75 | 4.5 | Uneven and hairy but impermeable |
| 2 | 50% by weight polypropylene reinforced with glass fibre mat as laminations | 2.1 | 4.9 | Irregular with protruding coarse fibre strands but impermeable |
| 3 | 50% by weight of polypropylene, 50% by weight 12 millimeter glass fibres prepared by conventional papermaking route and consolidated | 3.55 | 6.0 (i.e. to mould setting) | smooth and porous |
| 4 | 50% by weight of polypropylene, 50% by weight 12 millimeter long glass fibres prepared by process of UK Patents No. 1129757 and 1329409 | 2.65 | 6.0 (i.e. to mould setting) | smooth and porous |

It will be noted that only the two samples made by the papermaking methods expanded to fill the space between the platens and exerted sufficient pressure on the platen surfaces to produce a smooth, even surface.

The experiment was then repeated using samples made according to the process of UK Pat. Nos. 1129757 and 1329409, but using different thermoplastics as the matrix material and preheating the platens to 275° C. The results are set out in Table 2 and it will be seen that the materials behaved in substantially the same way as the third and fourth examples of Table 1.

TABLE 2

| Example | Material | Thickness (millimeters) Before expansion | Thickness (millimeters) After expansion | Surface character after expansion |
|---|---|---|---|---|
| 5 | 60% by weight polyethylene terephthalate 40% by weight 12 mm long glass fibres | 3.35 | 6.00 | smooth and porous |

TABLE 2-continued

| Example | Material | Thickness (millimeters) Before expansion | Thickness (millimeters) After expansion | Surface character after expansion |
|---|---|---|---|---|
| 6 | 60% by weight polycarbonate 40% by weight 12 millimeter long glass fibres | 3.60 | 6.00 | smooth and porous |

Although the flexural stiffness of these materials tend to increase during expansion, the extensional stiffness decreases so that a maximum flexural stiffness is reached at a degree of expansion that is found to be, very appropriately, 100%, that is when the expanded thickness is double that of the starting material.

It has been found that the proportion of glass fibre reinforcement used in the preparation of the material greatly affects its ability to expand. In general, samples containing more reinforcement expand more and produce a more porous surface. It is preferred to use at least 30% by weight of glass fibre in polypropylene (or an equivalent volume fraction in plastics of other densities) and at the most, 70% by weight. The best compromise for a good expansion and well bonded integral but porous surface is achieved with 50% by weight of glass fibre.

An improved end product may be achieved by laminating together several thin layers of materials of different compositions in the moulding process. Thus for example four sheets, each of a weight of 500 grams per square meter were prepared by the process of UK Pat. Nos. 1129757 and 1329409, two containing 40% by weight of 12 millimeter long glass fibre 11 microns in diameter and two 60% by weight of the same fibre, the balance of the content of each sheet being of polypropylene. The four sheets were assembled with the two outer layers being those containing the lower glass fibre content. The four sheets were then heated in an open press and it was noted that the two centre layers expanded more than the outer layers to produce a very thick, stiff sample with a smooth, even, well bonded surface.

Table 3 is a comparison of the effects of expansion between materials made according to the invention and two commercially available products produced by other processes. It will be seen that the materials of the invention could be expanded substantially without significant surface deterioration as compared with the commercially available products.

Table 4 shows the effect of glass content on expansion characteristics and demonstrates that an acceptable flexural modulus can be maintained for appropriate application even at a substantial degree of expansion.

Tables 5 and 6 show the effect of glass content on expansion, but in four ply sheets in which the various plies have differing glass contents.

Table 7 shows the effect of expansion on stiffness, demonstrating that stiffness increased with degree of expansion.

TABLE 3

| MATERIAL | EXAMPLE 7 - 35% GLASS 65% POLYPROPYLENE | EXAMPLE 8 - 50% GLASS 50% POLYPROPYLENE | SYMALIT | CHEMIE LINZ |
|---|---|---|---|---|
| FULLY CONSOLIDATED | | | | |
| Grammage (g/m$^3$) | 2560 | 3000 | 2835 | 2875 |
| Thickness (mm) | 2.27 | 2.45 | 2.52 | 2.55 |
| Flexural Modulus (MPa) | 4162 | 6130 | 4630 | 4260 |
| EXPANDED IN 4 mm GAP | | | | |
| Thickness (mm) | 3.89 | | 3.71 | 3.23 |
| Flexural Modulus (MPa) | 2076 | | 2295 | 2864 |
| Absorption Capacity | | | | |
| (%, 1 min) | 3.50 | | 2.70 | 4.10 |
| (%, 30 min) | 7.80 | | | 3.00 |
| Appearance | Flat, even surface | | Irregular, uneven surface | Flat, uneven surface |
| EXPANDED IN 5 mm GAP | | | | |
| Thickness (mm) | 4.78 | 5.00 | 4.66 | 3.89 |
| Flexural Modulus (MPa) | 1722 | 2015 | 1300 | 1700 |
| Absorption Capacity | | | | |
| (%, 1 min) | 4.40 | 54 | 5.90 | 6.20 |
| (%, 30 min) | 15 | | 6.60 | |
| Appearance | Flat, even surface | Flat, even surface | Grossly irregular, uneven surface | Flat, uneven surface |
| EXPANDED IN 7 mm GAP | | | | |
| Thickness (mm) | 6.50 | 6.60 | | |
| Flexural Modulus (MPa) | 843 | 781 | | |
| Absorption Capacity | | | | |
| (%, 1 min) | 5.20 | 83 | | |
| (%, 30 min) | 23 | 113 | | |
| Appearance | Irregular, even surface | Flat, even surface | | |

Units:
g/m$^2$ = Grams per square meter
mm = millimeters
MPa = Mega Pascals
min = minute

TABLE 4

| Example | Glass Content (see Note 3) (% wt.) | Grammage (g/m²) | Thickness (mm) | Density (g/cc) | EXPANSION Gap (mm) | EXPANSION Thickness (mm) | EXPANSION Density (g/cc) | % | Gurley Porosity (sec/100 ml) | Beck '22' (sec) | Absorpt. Capacity (%, 1 mm) | Flexural Modulus (MPa) | Stiffness Function | |
|---|---|---|---|---|---|---|---|---|---|---|---|---|---|---|
| 9  | 20 | 2170 | 2.10 | 1.04 | — | — | — | 0   | Non Porous | 267 | 0.2 | 3076 | 31  | 10³ |
| 10 |    | 2170 | 2.10 | 1.04 | 3 | 2.2  | 0.98 | 5   |            |     |     |      |     |     |
| 11 |    | 2205 | 2.13 | 1.04 | 4 | 2.28 | 0.97 | 5   |            |     |     |      |     |     |
| 12 | 40 | 2520 | 2.14 | 1.18 | — | — | — | 0   | Non Porous | 84  | 0.6 | 6393 | 59  | 10³ |
| 13 |    | 2520 | 2.14 | 1.18 | 3 | 2.88 | 0.87 | 35  | Non Porous | 2.2 | 2.8 | 3211 | 78  | 10³ |
| 14 |    | 2660 | 2.23 | 1.19 | 4 | 3.82 | 0.70 | 70  | 18         | 1.6 | 9.4 | 1336 | 73  | 10³ |
| 15 |    | 2660 | 2.23 | 1.19 | 5 | 4.29 | 0.62 | 90  |            |     | 14.6 |     |     |     |
| 16 | 60 | 2900 | 2.15 | 1.35 | — | — | — | 0   | Non Porous | 54  | 1.0 | 5493 | 54  | 10³ |
| 17 |    | 2900 | 2.15 | 1.35 | 3 | 2.97 | 0.98 | 40  | 28         | 15  | 9.7 | 4474 | 119 | 10³ |
| 18 |    | 2865 | 2.14 | 1.34 | 4 | 3.94 | 0.73 | 85  | 3          | 1.9 | 33.7 | 2377 | 144 | 10³ |
| 19 |    | 2865 | 2.14 | 1.34 | 5 | 4.87 | 0.59 | 130 | 1.5        |     | 70.2 | 1746 | 201 | 10³ |
| 20 |    | 2870 | 2.16 | 1.33 | 6 | 5.74 | 0.50 | 165 | 0.7        | 1.8 | 95.0 | 844  | 163 | 10³ |
| 21 |    | 2870 | 2.16 | 1.33 | 8 | 7.59 | 0.38 | 250 | 0.3        |     | 159.0 | 219 | 95  | 10³ |

NOTES:
[1]Expansion between heated platens set at nominal gap with spacers
[2]Glass - single fibres 13 millimeters long 11 microns diameter
[3]In all cases the balance percentage is of polypropylene powder.
[4]Units:
% wt = percentage by weight
g/m² = grams per square meter
mm = millimeters
g/cc = grams/cubic centimeter
sec/100 ml = second per 100 millimeters
MPa = Mega Pascals

TABLE 5

| | Example 22 | Example 23 | Example 24 |
|---|---|---|---|
| Construction:- Four Ply (glass % by weight in each ply) | 40/60/60/40 | 50/50/50/50 | 60/40/40/60 |
| Grammage (g/m²) | 2986 | 3000 | 2987 |
| BEFORE EXPANSION | | | |
| Thickness (mm) | 2.48 | 2.45 | 2.45 |
| Density (g/cc) | 1.20 | 1.22 | 1.22 |
| Tensile (MPa) | 48 | 34 | 48 |
| Flexural Modulus (MPa) | 6585 | 6133 | 5884 |
| Flexural Strength (MPa) | 101 | 80 | 87 |
| Stiffness Function (N · mm) | 117 10³ | 96 10³ | 99 10³ |
| AFTER 95% EXPANSION | | | |
| Density (g/cc) | 0.62 | 0.62 | 0.62 |
| Gurley Porosity (sec/100 ml) | 0.80 | 0.90 | 1.10 |
| Beck '22' Smoothness (sec) | 1.60 | 1.60 | 1.80 |
| Apparent Flexural Modulus (MPa) | 2210 | 2015 | 1700 |
| Flexural Strength (MPa) | 29 | 24 | 24 |
| Stiffness Function (N · mm) | 271 10³ | 253 10³ | 202 10³ |
| AFTER 175% EXPANSION | | | |
| Density (g/cc) | 0.45 | 0.45 | 0.45 |
| Apparent Flexural Modulus (MPa) | 914 | 781 | 860 |
| Flexural Strength (MPa) | 11 | 11 | 11 |
| Stiffness Function (N · mm) | 268 10³ | 224 10³ | 245 10³ |

NOTES
[1]Glass 13 millimeters long, 11 microns in diameter
[2]In all examples, the balance percentage is of polypropylene.
[3]Exapansion obtained between heated platens with spacer bars.
[4]Units:- g/m² = grams per square centimeter
g/cc = grams per cubic centimeter
MPa = Mega Pascals
N · mm = Newtons per millimeter
sec/100 ml = second per 100 millimeters
sec. = seconds

TABLE 6

| | Example 25 | Example 26 |
|---|---|---|
| Four Ply Construction (glass % by weight in each ply) | 40/40/40/40 | 25/55/55/25 |
| FULLY CONSOLIDATED | | |
| Grammage (g/m²) | 2207 | 1846 |
| Density (g/cc) | 1.22 | 1.21 |
| Flexural Modulus (MPa) | 4512 | 4337 |
| Stiffness Function (10³ N · mm) | 23 | 27 |
| Gurley Porosity (sec/100 ml) | >180 | >180 |
| EXPANDED | | |
| Expansion (%) | 97 | 83 |
| Flexural Modulus (MPa) | 1750 | 2778 |
| Stiffness Function (10³ N · mm) | 90 | 108 |
| Gurley Porosity (sec/100 ml) | 1 | 69 |
| EXPANDED | | |
| Expansion (%) | 133 | 138 |
| Flexural Modulus (MPa) | 1092 | 2079 |
| Stiffness Function (10³ N · mm) | 94 | 183 |
| Gurley Porosity (sec/100 ml) | 3 | 56 |

NOTES:
[1]Glass 13 millimeters long, 11 microns in diameter
[2]In all examples the balance percentage is of polypropylene
[3]Expansion between heated platens with spacer bars
[4]Units as in Table 5.

TABLE 7

| Example | Degree of Expansion % | Stiffness (N mm × 10³) |
|---|---|---|
| 27 | 0 | 11 |
| 28 | 55 | 22 |
| 29 | 90 | 37 |
| 30 | 110 | 43 |
| 31 | 150 | 38 |

Note:
40% by weight glass fibre 13 millimeters long, 11 microns diameter
60% by weight polyethylene terephthalate It will be evident that the expansion process can also be used with moulded articles which may be prepared for example according to the process described with reference to the accompanying drawings in which.

Figure 1:
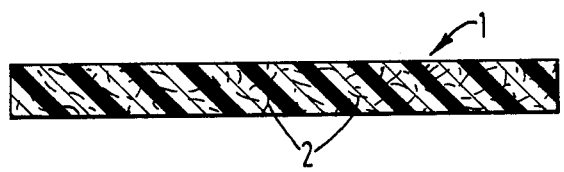
FIG. 1 is a cross section through a reinforced plastics sheet used in the process of the invention.

Referring first to FIG. 1, this shows a sheet 1 of thermoplastics material reinforced with glass fibres 2 of between 7 and 50 millimeters in length.

Figure 2:
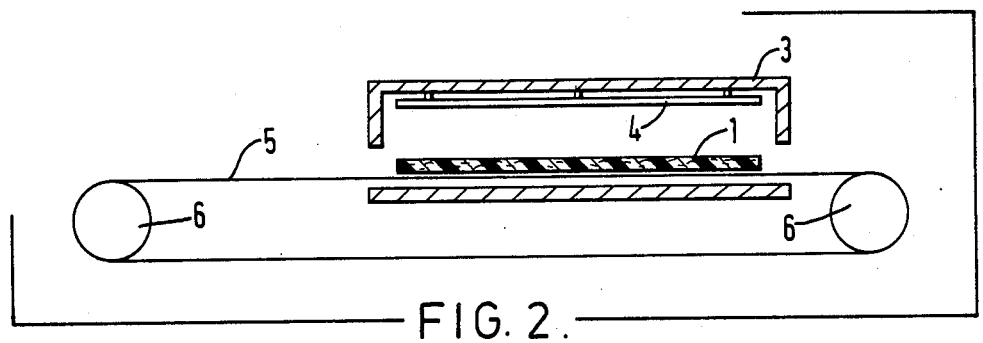
FIG. 2 is a cross section through an infrared heating oven.
Figure 3:
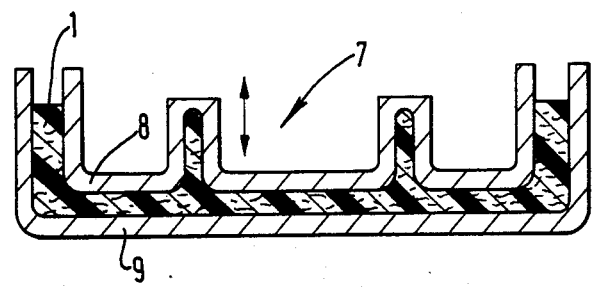
FIG. 3 is a cross section through a mould used in the process of the invention.

Referring now to FIG. 2, this shows an oven 3 having an infrared heating element 4 and a heat resistant belt 5 which is used to move the sheet 1 into and out of the oven for heating. The belt 5 is carried around tensioning rollers 6.

After heating, the sheet 1 is transferred to a mould 7 having upper and lower parts 8 and 9. The mould parts may, for example, be part of a suitable conventional hydraulic press means having a suitable conventional mould opening stop means to permit one of the mould parts 8, 9 to be withdrawn and provide an enlarged mould cavity. The stop means effectively controls the degree of expansion of the sheet by establishing a clerance between the mould parts 8, 9 which is less than the thickness which would be achieved by free unrestricted expansion. Thus, the mould portion 8 is inserted into the cavity of the mould portion 9 at least as far as necessary for the mould portions to have a clearance less than the thickness of free unrestricted expansion of the sheet. After introduction of the sheet 1 into the mould 7 the mould part 8 is advanced by the press means and, the parts 8 and 9 are subject to pressure. After the upper mould part 8 or forming is advanced, it is withdrawn from the second or lower mold part 9 to the stop means to allow the glass fibre component of the sheet 1 to recover and expand the moulding. In this arrangement, the mould parts may have a cooling means for simply cooling the mould when a previously heated sheet is shaped. The expansion process causes air to be drawn into the moulding and render it porous.

Alternatively, the mould parts may have heating and cooling means for heating the sheet while in the mould as well as for cooling the formed article in the mould, as indicated in the Comparative Example above.

Optionally, the process described can be varied in a number of ways. Thus, for example, the upper mould part 8 may be closed again after the sheet was expanded to partly consolidate it. Or the sheet may be allowed to freely expand to its maximum extent and then subjected to moulding. It will be appreciated that the degree of compaction will affect the porosity of the sheet and can therefore be used as a means of determining the porosity of the moulded article.

The porosity of the finished moulding is of particular benefit when it is intended to coat the moulded article with an adhesive or a soft plastics foam. By applying vacuum to the other side of the article with a suitable conventional vacuum means, good adhesion can be achieved without the necessity for drilling holes through the moulding.

We claim:

1. A process for moulding a porous article from fiber reinforced plastics material, comprising the steps of:
    providing a sheet of thermoplastics material which has been consolidated under heat and pressure and having dispersed therein from 20% to 70% by weight of flexurally stressed glass reinforcing fibers between about 7 and 50 millimeters long;
    heating said sheet to a temperature above the softening temperature of the thermoplastic material so that said sheet is mouldable and the flexural stresses in the fibres are released to cause the sheet to expand and become porous;
    shaping the expanded sheet into a porous article by subjecting said sheet to a moulding process in a moulding apparatus; and
    controlling expansion of the sheet in the moulding apparatus to a value less than free unrestricted expansion of the sheet such that at least a portion of the porosity of the expanded sheet is retained in the porous article.

2. A process as claimed in claim 1 in which the moulding process is performed in moulding apparatus having a forming tool, in which the apparatus has means for holding the position of the forming tool relative to a second mould part, and in which the degree of expansion is controlled by setting the dimensions of the forming tool to clearances less than the final thickness which would be achieved by free un-restricted expansion of said thermoplastic sheet.

3. A process as claimed in claim 2 in which the thermoplastics material has a least 30% by weight glass fibres.

4. A process as claimed in claim 2 in which the thermoplastics material has at least 30% by weight glass fibres.

5. A process as claimed in claim 3 in which the thermoplastics material has 50% by weight glass fibres.

6. A process as claimed in claim 5 in which the sheet is formed of at least two layers of plastics material of different compositions which are laminated together in the moulding process.

7. A process as claimed in claim 1 including the step of laminating at least two layers of plastics material of different compositions together in the moulding process.

8. A process as claimed in claim 7 including the step of laminating at least three layers, the outer layers having a lower fibre content by weight than the inner layer or layers.

9. A process as claimed in claim 8 in which the sheet is heated in an oven and then transferred to moulding apparatus having at least two parts, sufficient pressure is applied to the sheet in the moulding apparatus to conform the sheet to the two parts, the pressure is then released and at least two of the mould parts are separated to allow the fibre content of the moulded article to recover and expand the moulding to render it porous.

10. A process as claimed in claim 1 in which the sheet is heated in an oven to cause said sheet to expand and then transferred to moulding apparatus having at least two parts in which sufficient moulding pressure is applied to conform the sheet to the shape of the mould parts so that an article between the mould parts retains porosity from the expanded sheet.

11. A process as claimed in claim 10 in which sufficient moulding pressure is applied to said sheet in said moulding apparatus to conform said sheet to said two mould parts and then released and at least two of the mould parts are separated to allow the fibre content of the moulded article to recover and expand the moulding to render it porous.

12. A process as claimed in claim 1 in which the moulding apparatus has mould parts which are again closed after the moulding has expanded to partly consolidate the moulding.

13. A process as claimed in claim 1 which includes arranging for the sheet to be at a temperature sufficient to render it mouldable by heating in said moulding apparatus.

14. A process as claimed in claim 13 which includes arranging for the stresses embodied in the glass fibres to cause the matrix to expand into the configuration of said moulding apparatus.

15. An article of moulded fiber reinforced plastics material made by the process set forth in claim 1.

* * * * *